United States Patent
Bothien et al.

Patent Number: 6,164,655
Date of Patent: Dec. 26, 2000

[54] METHOD AND ARRANGEMENT FOR SEALING OFF A SEPARATING GAP, FORMED BETWEEN A ROTOR AND A STATOR, IN A NON-CONTACTING MANNER

[75] Inventors: Mihajlo Bothien, Waldshut-Tiengen, Germany; Joachim Bremer, Zürich, Switzerland; Jürg Greber, Wettingen, Switzerland; Markus Loos, Baden, Switzerland; Ulf Christian Müller, Kirchdorf, Switzerland; Dirk Wunderwald, Baden, Switzerland

[73] Assignee: Asea Brown Boveri AG, Baden, Switzerland

[21] Appl. No.: 09/213,429

[22] Filed: Dec. 17, 1998

[30] Foreign Application Priority Data

Dec. 23, 1997 [EP] European Pat. Off. .............. 97811017

[51] Int. Cl.[7] .................................................. F16J 15/447
[52] U.S. Cl. ........................... 277/303; 277/412; 277/418
[58] Field of Search .................................... 277/303, 412, 277/418, 419, 424

[56] References Cited

U.S. PATENT DOCUMENTS

| | | |
|---|---|---|
| 1,505,647 | 8/1924 | Junggren . |
| 3,572,728 | 3/1971 | Smuland .................................. 277/419 |
| 3,940,153 | 2/1976 | Stocker .................................... 277/418 |
| 4,335,886 | 6/1982 | Frey et al. ............................... 277/412 |
| 4,513,975 | 4/1985 | Hauser et al. . |
| 5,244,216 | 9/1993 | Rhode ..................................... 277/418 |
| 5,639,095 | 6/1997 | Rhode ..................................... 277/418 |

FOREIGN PATENT DOCUMENTS

| | | |
|---|---|---|
| 605508 | 5/1926 | France . |
| 532992 | 2/1941 | United Kingdom . |
| 684428 | 12/1952 | United Kingdom . |

OTHER PUBLICATIONS

"Beruhrungsfreie Dichtungen", Trutnovsky, et al., VDI–Verlag GmbH publication, 1981, pp. 244–245.

*Primary Examiner*—Anthony Knight
*Assistant Examiner*—Alison K. Pickard
*Attorney, Agent, or Firm*—Burns, Doane, Swecker & Mathis, L.L.P.

[57] ABSTRACT

The object of the invention is to provide an improved method for sealing off the separating gap, formed between a rotor and a stator, in a non-contacting manner, with which method the service life of the components involved can be increased. In addition, an arrangement for carrying out the method is to be shown. According to the invention, this is achieved in that the flow layers (35, 36), having different circumferential velocities, of the working fluid (18) are divided after the choking action into a first partial flow (35') having a high circumferential velocity and a second partial flow (36') having a low circumferential velocity, the first partial flow (35') is merely deflected, only the second partial flow (36') is swirled and is finally directed parallel to the deflected first partial flow (35') into the latter. To this end, the opposing surface (24) of the choke point (22) is designed as a flow divider for the working fluid (18). The vortex chamber (23) adjoins the flow divider (24) and is arranged further upstream than the feed duct (29) for the next sealing element (21).

9 Claims, 4 Drawing Sheets

METHOD AND ARRANGEMENT FOR SEALING OFF A SEPARATING GAP, FORMED BETWEEN A ROTOR AND A STATOR, IN A NON-CONTACTING MANNER

BACKGROUND OF THE INVENTION

1. Field of the Invention

The invention relates to a method for sealing off a separating gap, formed between a rotor and a stator, in a non-contacting manner, from the throughflow of a working fluid admitted to the separating gap, to an arrangement for carrying out the method.

2. Discussion of Background

In the construction of fluid-flow machines, labyrinths, i.e. non-contacting motion seals, are often used to seal off components rotating at high speed. A multiplicity of the most diverse labyrinth seals are known, but their operating principle is always based on minimizing the fluid mass flow through the labyrinth. To this end, they generally have a plurality of sealing elements, which are of similar construction and are arranged one after the other in the direction of flow of the working fluid, for the separating gap which is formed between the rotor and the stator and is to be sealed off. Each sealing element consists of at least one choke point and a vortex chamber adjoining downstream, the choke point and the vortex chamber being more or less greatly pronounced in the many different labyrinth seals. By the arrangement of sealing elements in a row, the flow resistance can be increased as desired and thus the fluid quantity passing through the seal can be kept small.

The textbook "Berührungsfreie Dichtungen" by K. Trutnovsky, VDI-Verlag GmbH, Dusseldorf 1981, 4th edition, ISBN3-18-400490-2, page 244/245, FIGS. 4–58 and 4–59 discloses labyrinth seals in which the surface opposite the choke points is given a particular fluidic design. Thus, these surfaces have conical widened portions with adjoining hollow bulbous surfaces or curved niches. It is thus possible to both extend the flow path up to the next choke point and prevent the shooting of flow filaments straight through the gap, as a result of which the fluid mass flow passing through the seal can ultimately be further reduced.

In the known labyrinth seals, considerable friction power occurs as a result of the forming flow boundary layers in the separating gap, through which fluid flows, between the rotating and the stationary components. This leads to heating of the working fluid in the separating gap and thus likewise to heating of the components surrounding the separating gap. In this way, the material temperatures may increase to a relatively high degree, which results in a reduced service life of the components affected. In addition, the deflection and swirling of the working fluid, flowing through the separating gap, at the choke points lead to continuous intermixing of the working fluid, combined with a high impulse and heat exchange. Downstream of the choke point, the working fluid must in each case be accelerated again in the circumferential direction at the rotating component, as a result of which the friction power and thus the development of heat in this region continue to increase.

SUMMARY OF THE INVENTION

Accordingly, one object of the invention, in attempting to avoid all of these disadvantages, is to provide an improved method for sealing off the separating gap, formed between a rotor and a stator, in a non-contacting manner, with which method the service life of the components involved can be increased. In addition, an arrangement for carrying out the method is to be shown.

According to the invention, this is achieved in that the flow layers of the working fluid are divided after the choking action into a first partial flow having a high circumferential velocity and a second partial flow having a low circumferential velocity. The first partial flow is then merely deflected, only the second partial flow is swirled and is finally directed parallel to the deflected first partial flow into the latter. To this end, the opposing surface on which the working fluid impinges downstream of the choke point is designed as a flow divider for this working fluid. The vortex chamber adjoins the flow divider in the opposite direction to the main flow direction. On the other hand, the feed duct for the next sealing element or the discharge duct are arranged so as to adjoin the flow divider in the main flow direction. In addition, the vortex chamber has a larger inner surface than the separating gap adjoining the vortex chamber.

By the dividing of the flow, i.e. by the separation of the flow layer formed at the stationary wall of the stator and having a relatively low circumferential velocity from the flow layer formed at the rotating wall of the rotor and having a relatively high circumferential velocity, into two partial flows, the friction power as well as the impulse and heat exchange between the layers can be reduced. The second partial flow provided with a low circumferential velocity is pared off by the flow divider into the vortex chamber and swirled there. The pressure reduction which is achieved in the process increases the sealing effect of the labyrinth. In the vortex chamber, the working fluid of the second partial flow gives off some of the friction heat to the surrounding wall of the stator. In contrast, the first partial flow provided with a high circumferential velocity is merely deflected by the flow divider, so that it can flow largely undisturbed through the separating gap. In this way, apart from the friction power, the transfer of heat into the rotating wall of the rotor is also reduced.

With the method according to the invention and the corresponding arrangement, the friction power which develops and the heat flow into the rotor can be minimized on the one hand in the case of a sealing effect comparable with the prior art and an improved sealing effect can be achieved on the other hand in the case of comparable thermal loading of the rotor.

By at least two sealing elements being arranged so as to follow one another, the forming of flow layers having different circumferential velocities in the working fluid, the subsequent choking action of the working fluid, the subsequent division of the fluid into two partial flows having different circumferential velocities and both the subsequent deflection of the first partial flow and the swirling of only the second partial flow as well as the parallel directing of the latter into the deflected first partial flow are carried out at least twice one after the other in this sequence. The sealing off of the separating gap can thus be further improved.

In an especially advantageous manner, the flow divider consists of at least two sectional surfaces of the stator, which have a raised contact edge projecting into the separating gap. A relatively simple and cost-effective construction of the flow divider is thus ensured.

In addition, it is especially expedient if the vortex chamber is formed at an angle $\alpha$ 45°±20° to the main flow direction of the working fluid. This results in a sudden cross-sectional widening of the separating gap downstream of the choke point and thus promotes the vortex formation in the second partial flow provided with a low circumferential velocity. In this way, an improved sealing effect of the sealing element can be achieved.

The feed duct and the discharge duct have a gap width, and the choke point has a clearance width, the gap width always being designed to be larger than the clearance width of the choke point. The sealing effect of the sealing element is thus relatively independent of changes in the gap width of the separating gap.

Finally, the sealing element is arranged in a fluid-flow machine, and the choke point is formed axially, radially or diagonally to the machine axis of the fluid-flow machine. Thus there is advantageously a relatively wide range of application for the solution according to the invention.

In an embodiment of the invention, the rotor is designed as a compressor impeller of a radial compressor, and the stator is designed as an intermediate wall of the radial compressor, which intermediate wall closes off the compressor impeller on the machine side. The sealing element is arranged between a rear wall of the compressor impeller and the intermediate wall, and the choke point is arranged parallel to the machine axis of the radial compressor. On account of the high circumferential velocities of about 500 m/s at the rear wall of radial compressors, the positive effects of the arrangement on the service life of the corresponding components or on the sealing off are especially pronounced.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings of a labyrinth seal arranged on the compressor-impeller rear wall, of the radial compressor of a turbocharger, wherein.

Only the elements essential for the understanding of the invention are shown. Not shown are, for example, the line for the discharge of the working fluid passing through the labyrinth seal, the turbine side and the bearing arrangement of the turbocharger. The direction of flow of the working media is designated by arrows.

DESCRIPTION OF THE PREFERRED EMBODIMENTS

Figure 1:
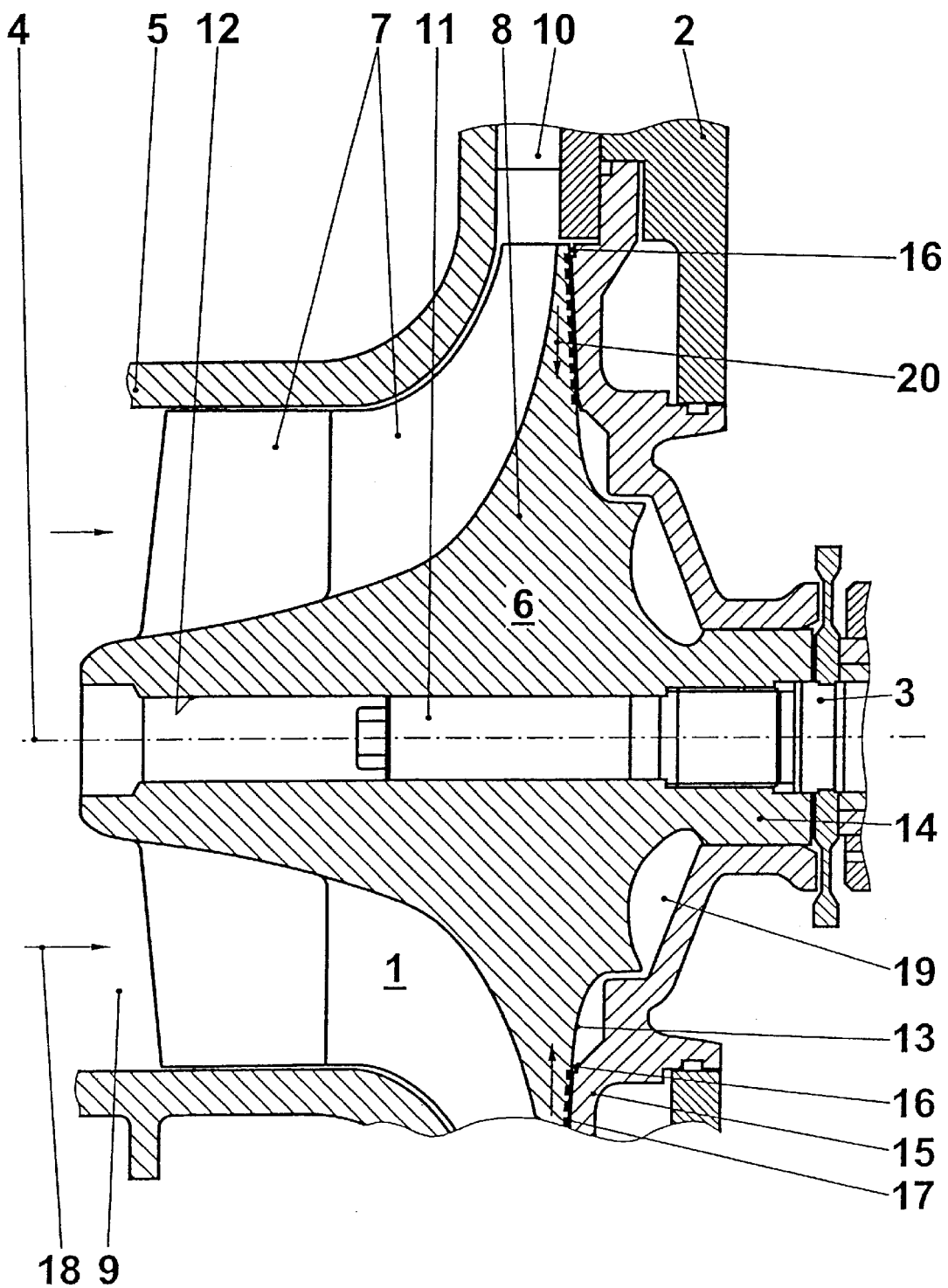
FIG. 1. shows a partial longitudinal section through a radial compressor of the prior art.

Referring now to the drawings, wherein like reference numerals designate identical or corresponding parts throughout the several views, the exhaust-gas turbocharger, only partly shown in FIG. 1, of the prior art consists of a radial compressor 1 and an exhaust-gas turbine (not shown), which are connected to one another via a shaft 3 supported in a bearing casing 2. The radial compressor 1 of the exhaust-gas turbocharger has a machine axis 4 lying in the shaft 3. It is equipped with a compressor casing 5, in which a rotor 6 designed as compressor impeller is rotatably connected to the shaft 3. The compressor impeller 6 has a hub 8 set with a multiplicity of moving blades 7. A flow duct 9 is formed between the hub 8 and the compressor casing 5. Downstream of the moving blades 7, a radially arranged, bladed diffuser 10 adjoins the flow duct 9, and this diffuser 10 in turn leads into a spiral (not shown) of the radial compressor 1.

A central through-bore 12 accommodating an end 11 of the shaft 2 is formed in the hub 8. On the turbine side, the hub 8 has a rear wall 13 and a fastening socket 14 for the shaft end 11, the latter and the fastening socket 14 being screwed to one another. Of course, another suitable compressor-impeller/shaft connection, for example without through bore 13, may also be selected. Likewise, the use of an unbladed diffuser is also possible.

The bearing casing 2 and the compressor casing 5 are separated from one another by means of a stator 15, which is designed as an intermediate wall and also accommodates the fastening socket 14 of the hub 8 of the compressor impeller 6. A separating gap 16 arranged mainly radially to the machine axis 4 is formed between the rear wall 13 of the compressor impeller 6, rotating during operation, and the fixed intermediate wall 15. The separating gap 16 accommodates a labyrinth seal 17, which is designed as a comb labyrinth and seals off the separating gap 16 from the throughflow of a working fluid 18, admitted to the latter, of the radial compressor 1. Downstream of the labyrinth seal 17, the separating gap 16 communicates with an intermediate space 19, which in turn is connected to a discharge line (not shown).

When such a labyrinth seal 17 of appropriate length is used, only a predetermined, small mass flow of the working fluid 18 can pass through the seal into the intermediate space 19. This fluid 18 is finally removed via the discharge line adjoining the intermediate space 19.

In contrast, the labyrinth seal 17 in the solution according to the invention consists of a plurality of sealing elements 21 which are arranged one behind the other in the main flow direction 20 of the working fluid 18 flowing through the labyrinth seal 17 and have in each case a choke point 22, a vortex chamber 23 and an opposing surface 24, which is located at the intermediate wall 15 and on which the working fluid 18 impinges downstream of the choke point 22. The opposing surface 24 is designed as a flow divider for the working fluid 18. It consists of two curved sectional surfaces 25, 26 of the intermediate wall 15, which in each case are arranged on a different radius and have a common, raised contact edge 27 projecting into the separating gap 16.

To accurately position the flow divider 24, the impingement point of the working fluid 18 downstream of the choke point 22 must be determined, in which case differently shaped sealing elements have impingement points differing from one another. To this end, corresponding flow tests are necessary, in which case fluidic computation methods may of course also be advantageously utilized.

Figure 2:
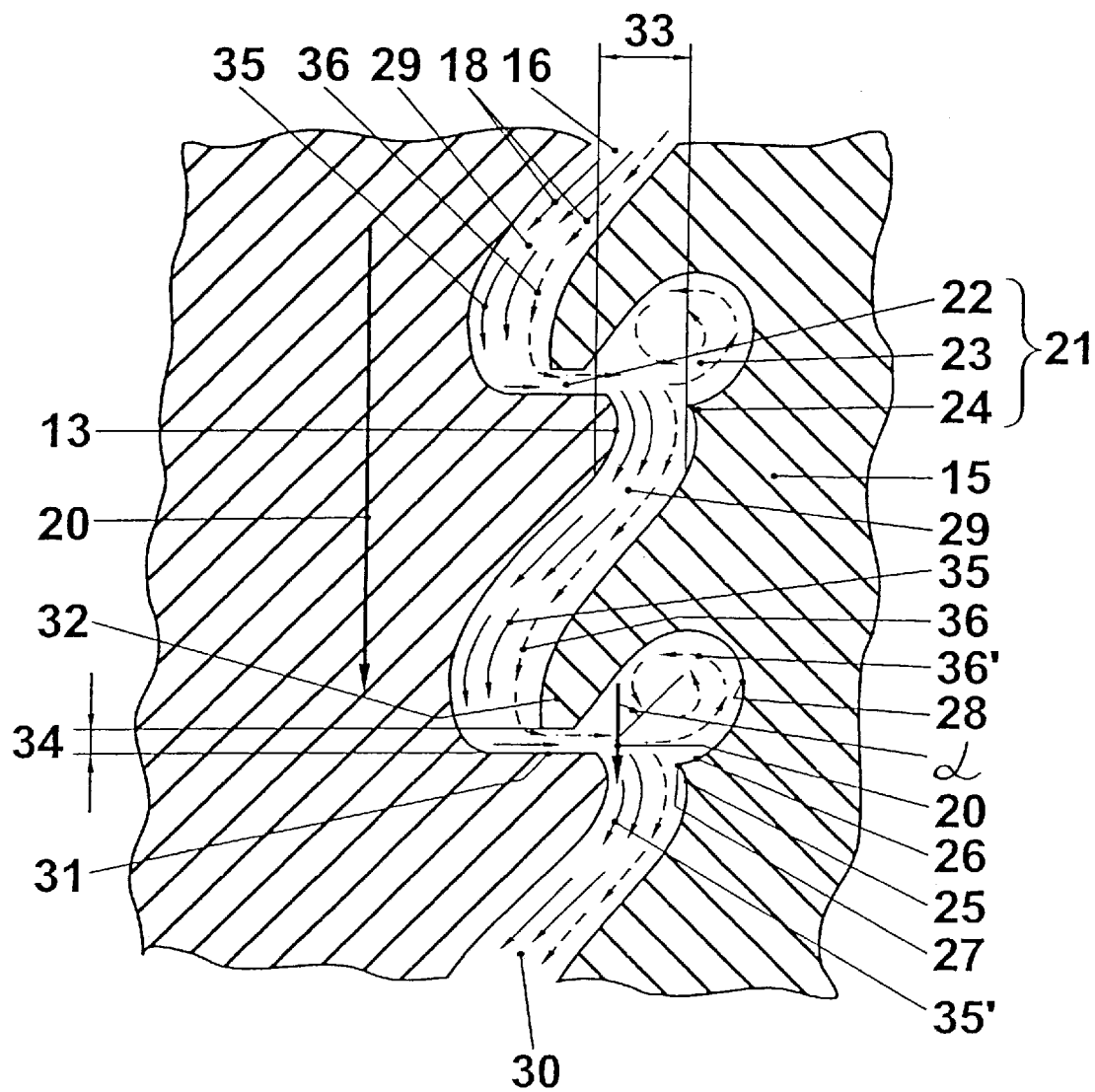
FIG. 2. shows a diagrammatic sketch of two sealing elements according to the invention which are arranged one after the other.
Figure 3:
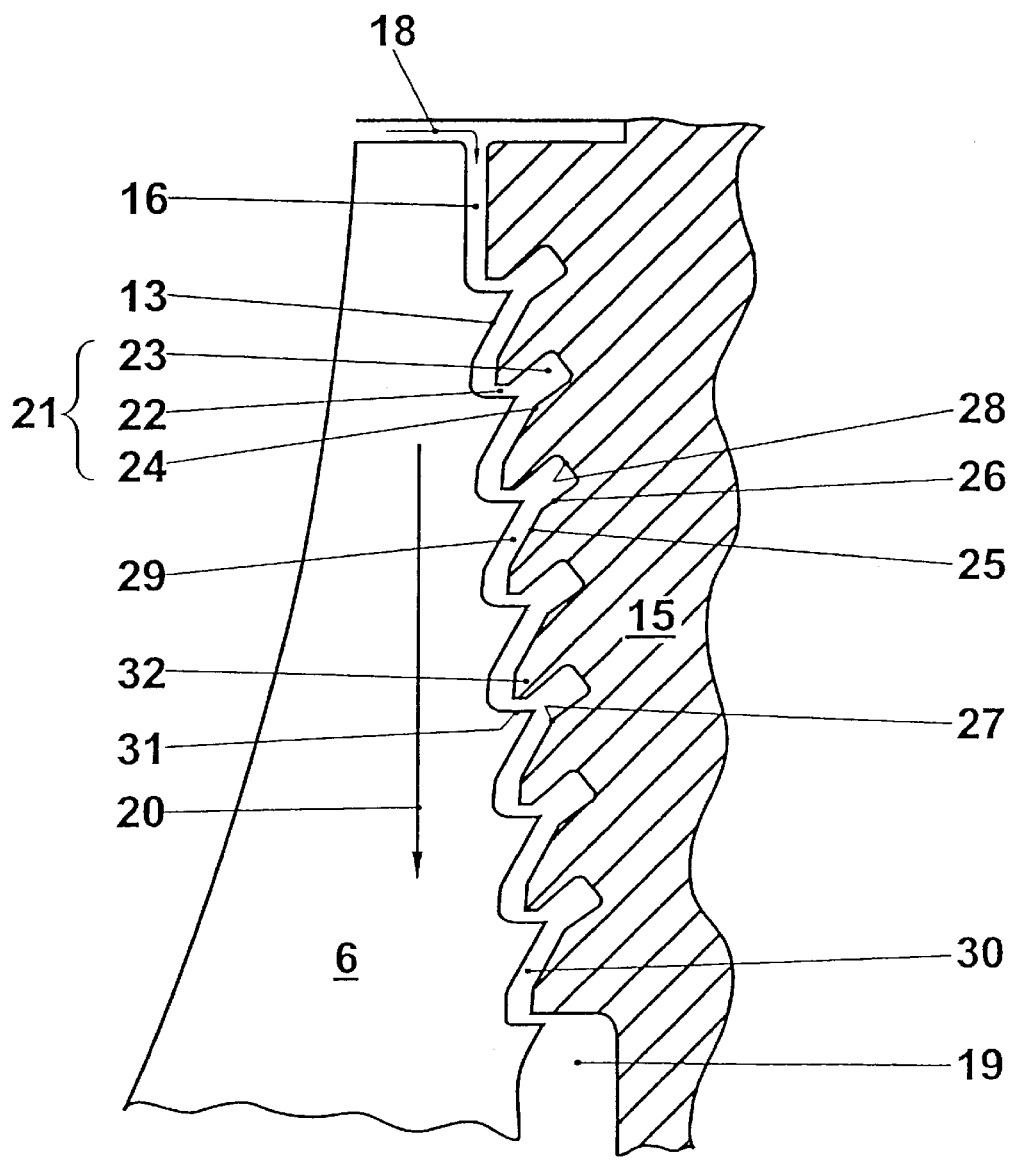
FIG. 3. shows an enlarged detail of the radial compressor according to FIG. 1 but with the labyrinth seal according to the invention.

The vortex chamber 23 adjoins the flow divider 24, more precisely its second sectional surface 26 arranged on a larger radius, and is itself arranged on a larger radius than the latter. In addition, the vortex chamber 23 is provided with a larger inner surface 28 than the separating gap 16 adjoining the vortex chamber 23 and is arranged at an angle $\alpha$ of about 45° to the main flow direction 20 of the working fluid 18 (FIG. 2). It is of circular design but may also have another suitable shape, as shown, for example, in FIG. 3 with a mainly rectangular shape. The angle a at which the vortex chamber 23 is set relative to the main flow direction 20 may differ by 20° in both directions. Larger differences are of course also possible, but with a lesser effect. Likewise, the two sectional surfaces 25, 26 may also be of straight design (FIG. 3).

The separating gap 16 is designed as an essentially radially oriented feed duct 29 upstream of each sealing element 21 and as a likewise essentially radially oriented discharge duct 30 downstream of the last sealing element 21. The feed duct 29 and the discharge duct 30 respectively directly adjoin the first sectional surface 25 arranged on a smaller radius.

The choke points 22 are designed as axial gaps, so that the feed ducts 29 each undergo a deflection in the axial direction. To this end, an axially oriented, rotating step 31 is formed for each choke point 22 on the rear wall 13 of the compressor impeller 6, and this step 31 corresponds with a stationary sealing finger 32, oriented essentially parallel thereto, of the intermediate wall 15. In this case, the width of the sealing finger 32 may be designed to be substantially smaller than that of the rotating step 31, in which case sufficient overlap with the step 31 in all operating states must be ensured. Of course, instead of the sealing finger 32, other suitable elements, such as, for example, sealing strips or brush seals (not shown), may also be used. The feed ducts 29 and the discharge duct 30 respectively have a gap width 33, and the choke point 22 has a clearance width 34, the gap width 33 always being designed to be larger than the clearance width 34.

During operation of the turbocharger, the compressor impeller 6 draws in ambient air as working fluid 18, which passes via the flow duct 9 and the diffuser 10 into the spiral, is compressed there and is finally used to charge an internal combustion engine (not shown) connected to the turbocharger. On its way from the flow duct 9 to the diffuser 10, the ambient air 18 is also admitted to the separating gap 16 and thus passes via the feed duct 29 into the labyrinth seal 17, i.e. first of all to its first sealing element Due to the influence of the rotating rear wall 13 of the compressor impeller 6 on the one hand and the stationary intermediate wall 15 on the other hand, flow layers 35 having relatively high circumferential velocity as well as flow layers 36 having relatively low circumferential velocity are formed in the ambient air 18 flowing through the separating gap 16. The flow layers 35, 36 are concentrated in each case at that all 13, 15 of the separating gap 16 which is decisive or their formation.

Since the width 33 of the separating gap 16 is designed to be larger than the clearance width 34 of the choke point 22, the boundary layers in contact with the walls 13, 15 are not compressed, so that only slight friction power occurs and the negative development of heat likewise remains low. In addition, the sealing effect of the sealing element 21 is relatively independent of changes in the width 33 of the separating gap 16.

In the region of the choke point 22, the ambient air 18 is deflected in the axial direction and accelerated and, downstream of the choke point 22, impinges on the flow divider 24 arranged on the intermediate wall 15. In the process, the flow layers 35, 36 of different circumferential velocity are split up into two separate partial flows 35', 36' having correspondingly different circumferential velocities. The first sectional surface 25, arranged on a smaller radius, of the intermediate wall 15 deflects the first partial flow 35', provided with a higher circumferential velocity, directly into the feed duct 29 of the following sealing element 21 or into the discharge duct 30. On the other hand, the second sectional surface 26 arranged on a larger radius pares off the second partial flow 36', provided with lower circumferential velocity, into the vortex chamber 23. The second partial flow 36' is first of all swirled there and is then directed, parallel to the first partial flow 35', into the feed duct 29 or respectively into the discharge duct 30. On account of the rotational movement of the rear wall 13, the formation of two flow layers 35, 36 of different circumferential velocity again occurs downstream of the combined flow of the working fluid 18, and these two flow layers 35, 36 are passed on together to the second sealing element 21.

Depending on the design of the labyrinth seal 17, i.e. in accordance with the number of sealing elements 21, the action already described repeats itself. Downstream of the last sealing element 21, the two partial flows 35', 36' are delivered into the intermediate space 19 and finally from there to the atmosphere by means of the discharge line.

Figure 4:
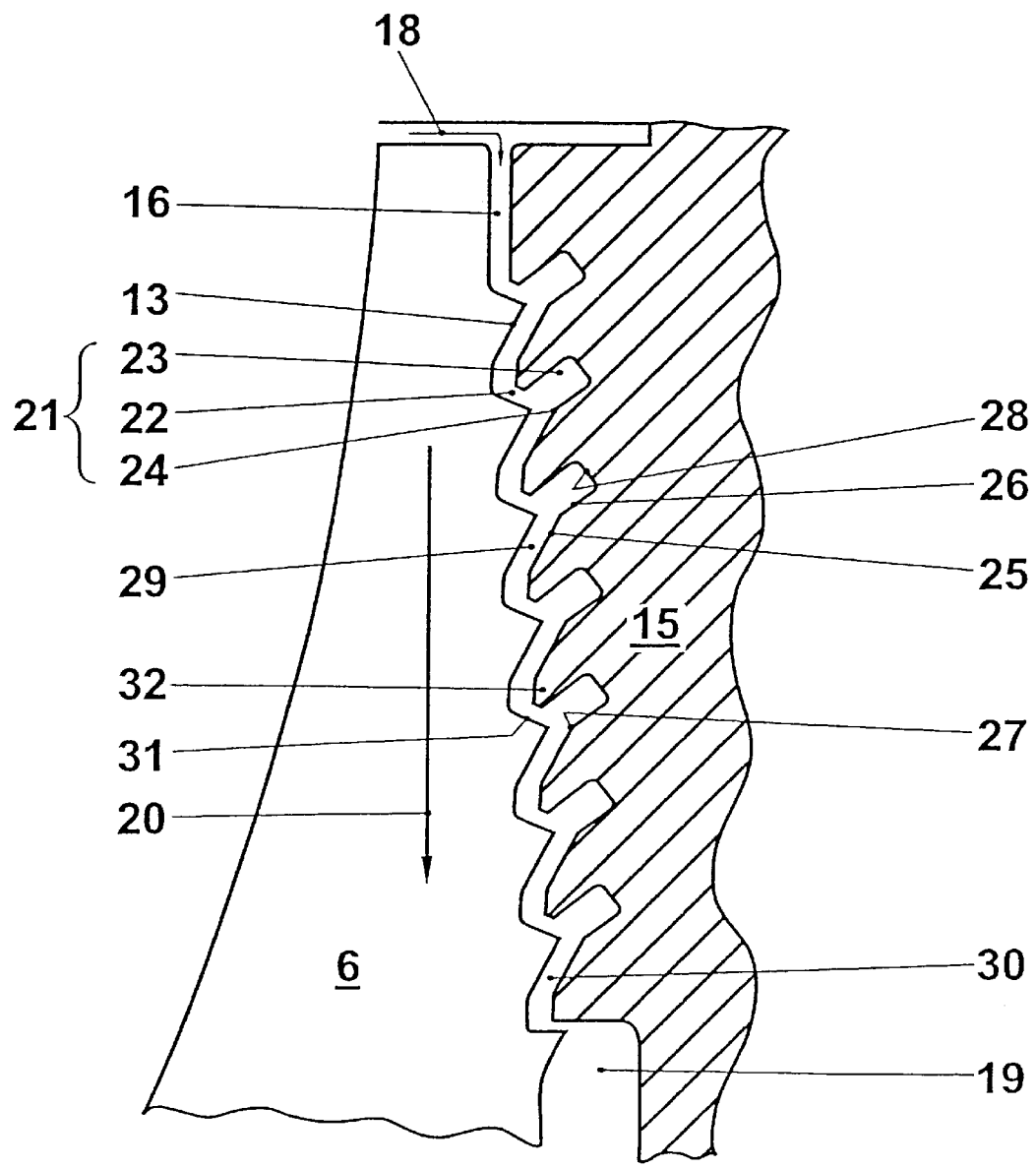
FIG. 4. shows a representation according to FIG. 3 but with a choke point arranged diagonally to the machine axis.

The arrangement according to the invention may of course also be used in another fluid-flow machine, for example a gas turbine, a steam turbine or in the radial compressor of a refrigerator. The use of other working fluids 18 is also possible. In addition, the separating gap 16 may also be arranged parallel to the machine axis 4 and thus the choke point 22 may be designed as a radial gap (not shown). In both the case of a separating gap 16 arranged radially to the machine axis 4 and a separating gap 16 arranged parallel to the machine axis 4, the choke point 22 may be formed diagonally to the machine axis 4 of the corresponding fluid-flow machine (FIG. 4). Here, the essential steps of the method in each case run in a similar manner to the sequences already described.

Obviously, numerous modifications and variations of the present invention are possible in light of the above teachings. It is therefore to be understood that, within the scope of the appended claims, the invention may be practiced otherwise than as specifically described herein.

LIST OF DESIGNATIONS

1 Radial compressor
2 Bearing casing
3 Shaft
4 Machine axis
5 Compressor casing
6 Rotor, compressor impeller
7 Moving blade
8 Hub
9 Flow duct
10 Diffuser
11 Shaft end
12 Through-bore
13 Rear wall
14 Fastening socket
15 Stator, intermediate wall
16 Separating gap
17 Labyrinth seal
18 Working fluid, ambient air
19 Intermediate space
20 Main flow direction
21 Sealing element
22 Choke point
23 Vortex chamber
24 Opposing surface, flow divider
25 Sectional surface, first
26 Sectional surface, second
27 Contact edge
28 Inner surface
29 Feed duct
30 Discharge duct 31 Step
32 Sealing finger
33 Gap width, of 29 or 30
34 Clearance width, of 22
35 Flow layer (high circumferential velocity)
36 Flow layer (low circumferential velocity)
35' Partial flow, first

What is claimed as new and desired to be secured by Letters Patent of the United States is:

1. A method for sealing off a separating gap formed between a rotor and a stator in a non-contacting manner from the throughflow of a working fluid admitted to the separating gap, comprising the steps of:

forming in the working fluid, flow layers having different circumferential velocities;

choking the working fluid in the separating gap;

dividing the flow layers of the working fluid after the choking action into a first partial flow having a high circumferential velocity and a second partial flow having a low circumferential velocity;

deflecting the first partial flow;

swirling the second partial flow; and directing the second partial flow parallel to the deflected first partial flow and into the first partial flow.

2. The method as claimed in claim 1, wherein each of the steps are repeated at least twice.

3. An arrangement sealing off a separating gap, formed between a rotor and a stator, in a non-contacting manner from the throughflow of a working fluid admitted to the separating gap in a main flow direction, in which arrangement at least one sealing element, consisting of a choke point, an opposing surface which is located on the stator and on which the working fluid impinges downstream of the choke point, and a vortex chamber, is arranged in the separating gap, and the separating gap is designed as a feed duct upstream of each sealing element and as a discharge duct downstream of the sealing element, wherein the opposing surface is designed as a flow divider for the working fluid, the vortex chamber is arranged in the opposite direction to the main flow direction, and the feed duct or the discharge duct are arranged so as to adjoin the flow divider in the main flow direction.

4. The arrangement as claimed in claim 3, wherein the flow divider consists of at least two sectional surfaces of the stator, which have a raised contact edge projecting into the separating gap.

5. The arrangement as claimed in claim 4, wherein the vortex chamber has a larger inner surface than the separating gap adjoining the vortex chamber.

6. The arrangement as claimed in claim 5, wherein the vortex chamber is formed at an angle $\alpha$ of $45°\pm20°$ to the main flow direction of the working fluid.

7. The arrangement as claimed in claim 3, wherein the feed duct and the discharge duct have a gap width, and the choke point has a clearance width, the gap width being designed to be larger than the clearance width of the choke point.

8. The arrangement as claimed in claim 3, wherein the sealing element is arranged in a fluid-flow machine having a machine axis, and the choke point is formed axially, radially or diagonally to the machine axis.

9. The arrangement as claimed in claim 8, wherein the rotor is designed as a compressor impeller of a radial compressor, the stator is designed as an intermediate wall of the radial compressor, which intermediate wall closes off the compressor impeller on the machine side, the sealing element is arranged between a rear wall of the compressor impeller and the intermediate wall, and the choke point is arranged parallel to the machine axis of the radial compressor.

* * * * *